H. R. BICKFORD
PRESSURE REGULATING DEVICE.
APPLICATION FILED JULY 23, 1913.

1,103,474.

Patented July 14, 1914.

WITNESSES:
Charles Pickles
R. S. Barry

INVENTOR
Henry R. Bickford,
BY G. H. Strong
ATTORNEY

UNITED STATES PATENT OFFICE.

HENRY R. BICKFORD, OF MONTEREY, CALIFORNIA.

PRESSURE-REGULATING DEVICE.

1,103,474.  Specification of Letters Patent.  Patented July 14, 1914.

Application filed July 23, 1913.  Serial No. 780,668.

*To all whom it may concern:*

Be it known that I, HENRY R. BICKFORD, a citizen of the United States, residing at Monterey, in the county of Monterey and State of California, have invented new and useful Improvements in Pressure-Regulating Devices, of which the following is a specification.

This invention relates to a pressure regulating device.

The purpose of this invention is to provide a simple, substantial, cheaply manufactured pressure regulating device which is especially adapted to be used in connection with tire inflating pumps or like devices.

The object of this invention is to construct a simple device of the kind described, which will not only register the pressure, but which is also provided with means for automatically shutting off the air the moment the required pressure has been obtained.

A further object is to so construct the device that it can readily be set to operate at predetermined pressures and automatically shut off the air supply when such predetermined pressure is exceeded.

The invention consists of the parts and the construction and combination of parts as hereinafter more fully described and claimed, having reference to the accompanying drawings, in which—

Figure 1:
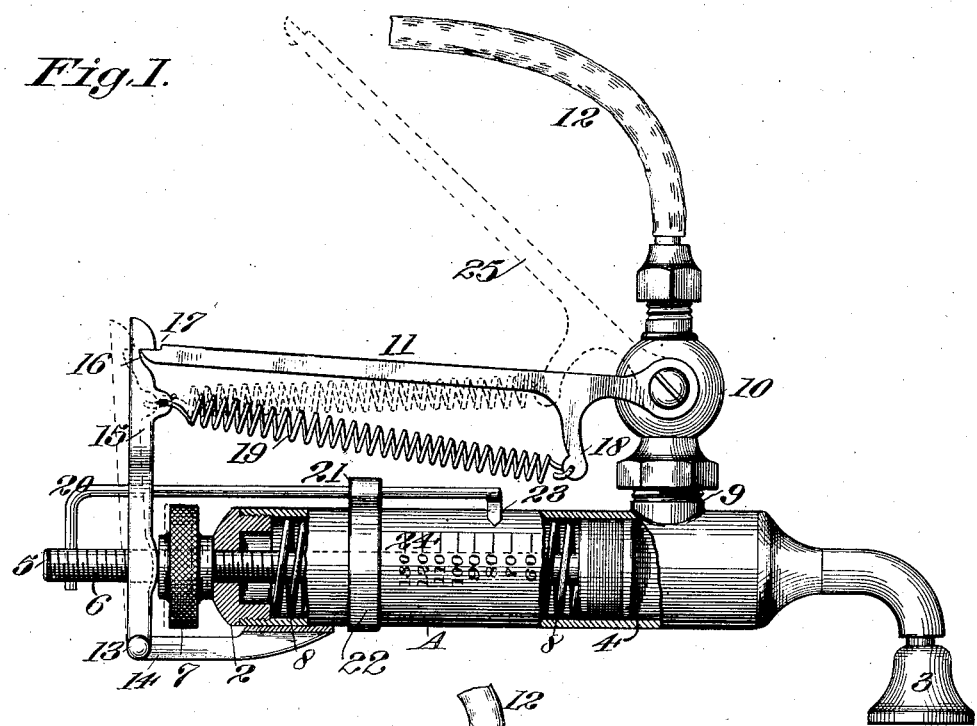
Figure 2:
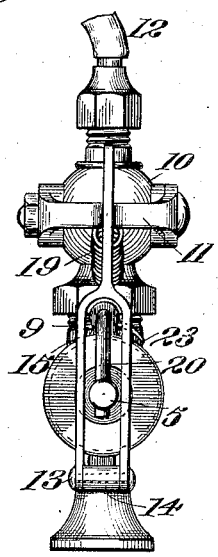

Figure 1 is a side elevation partly broken away. Fig. 2 is an end view of same.

Referring to Fig. 1 of the drawings, A indicates a cylinder having a head 2 at one end and a suitable valve connection 3 at the other end connected with the piston 4, slidably mounted within the cylinder. Projecting through the head 2 a suitable distance is a rod 5, the outer end of which is threaded, as at 6, for the purpose of receiving an adjusting screw 7. Interposed between the piston 4 and the head 2 is a coil spring 8, the function of which will be later described.

Secured to one end of the cylinder, as at 9, is a suitable form of air controlling valve 10 provided with a controlling or operating lever 11 which is normally adapted to assume a position practically parallel with the cylinder A when the valve is open.

This permits air under pressure, which may be supplied from any suitable source, as a pressure tank, pump, or like device, to pass through the hose 12, valve 10, cylinder A, and tire valve connection 3 to inflate the tire.

Pivotally mounted, as at 13, upon a bracket 14 suitably secured to the end of the cylinder is a trigger arm 15, the outer end of which is notched, as at 16, for the purpose of receiving and retaining the outer notched end 17 of the valve controlling lever 11. A spring 19 connects the trigger arm 15 and a projecting supplementary arm 18 formed on the lever 11. This spring 19 is provided for the purpose of holding the trigger in engagement with relation to the notched end of the arm 11.

Suitably secured to the outer end of the threaded rod 5 is a pointer or pressure indicating arm 20, which is guided, as at 21, upon a bracket 22 secured upon the cylinder A. The inner end of the indicator arm 20 is provided with a pointer 23, which is so positioned as to register with a pressure scale or similar device 24 suitably secured or otherwise formed on the outer surface of the cylinder A.

The threaded rod 5 is secured to the piston 4 within the cylinder, together with the adjusting screw 7, and the coil spring 8 is provided for the purpose of regulating or predetermining the pressure to which it is desired to inflate the tire. For instance, if it is desired to inflate the tire to not exceed 80 pounds pressure, it is only necessary to move the adjusting screw 7 until the rod 5, with connected piston, is moved into such a position that the pointer will indicate 80 pounds. The movement of the piston, with relation to the coil spring 8 interposed between the head of the cylinder and the piston, is thus transmitted to compress the coil spring 8 to such a tension that the piston will not be actuated by the air pressure within the cylinder until 80 pounds pressure has been exceeded.

The operation of the device will be as follows: When it is desired to inflate the tire, it is only necessary to place the connection 3 on top of the tire valve (not here shown). The air is then admitted from any suitable source (not here shown) and allowed to pass through the hose 12, valve 10, cylinder A, and connection 3 to inflate the tire. The moment the tire has been inflated to 80 pounds pressure sufficient back pressure will be created in the cylinder to move the piston in an outward direction. This movement of the piston will instantly be transmitted through the rod 5 and adjusting screw 7 to lift the trigger arm 15 out of engagement with the notched end 17 of the valve controlling lever 11. The moment the trigger has been lifted out of engagement with the notched end of the arm 11, it will be seen that the tension of the spring 19 will be instantly transmitted through the supplementary lever extension 18 to throw the arm 11 into the dotted line position indicated at 25, when the air supply will be instantly shut off. It is thus impossible to overcharge the tire and accidental blow-outs of this nature are entirely obviated, as the air supply is automatically cut off the moment the tire has been charged to the predetermined pressure.

By constructing a pressure regulating device as here shown it is not only possible to automatically shut off the air supplied the moment the desired pressure has been obtained, but it is also possible to regulate the point of cut off to suit various pressures, this being accomplished by simply adjusting the tension of the coil spring 8 and the pressure being automatically indicated by the sliding point or indicator.

A device constructed as here shown is simple and compact in construction and reliable and automatic in action. The materials and finish of the several parts of the apparatus are such as experience and judgment of the manufacturer may dictate.

I wish it understood that the device may be installed in any suitable position between the source of pressure supply and the tire inflating valve, and that any suitable tire valve connection besides the one here shown may be employed.

Having thus described my invention, what I claim and desire to secure by Letters Patent is—

1. The combination in a pressure regulating device, of a cylinder, a valve controlled inlet and outlet on said cylinder, a slidably mounted piston within said cylinder adapted to be actuated by air pressure admitted through the inlet, a rod secured to the piston extending through one end of the cylinder, a trigger arm pivotally secured to the cylinder adapted to be actuated by said rod and piston, an operating lever secured to the valve adapted to be normally secured by the trigger arm to hold the valve in an open position, and a spring connecting the valve lever and trigger for throwing this valve into a closed position when released by the trigger arm.

2. The combination in a pressure regulating device, of a cylinder, a valve controlled inlet and outlet on said cylinder, a slidably mounted piston within said cylinder adapted to be actuated by air pressure admitted through the inlet, a rod secured to the piston extending through one end of the cylinder, a coil spring interposed between one end of the cylinder and the piston, a pressure regulating nut on the rod for regulating the tension of said spring, a trigger arm pivotally secured to the cylinder adapted to be lifted by said nut, an operating lever secured to the valve, the outer end of which is adapted to be normally thrown into engagement with the trigger arm to hold the valve in an open position, a spring connecting the valve lever and trigger arm adapted to throw the valve into closed position when the valve lever is released by the trigger arm, and means for indicating the pressure within the cylinder the moment the valve is closed.

3. The combination in a pressure regulating device, of a cylinder, a valve controlled inlet and outlet on said cylinder, a slidably mounted piston within said cylinder adapted to be actuated by air pressure admitted through the inlet, a rod secured to the piston extending through one end of the cylinder, a coil spring interposed between one end of the cylinder and the piston, a pressure regulating nut on the rod for regulating the tension of said spring, a trigger arm pivotally secured to the cylinder adapted to be lifted by said nut, an operating lever secured to the valve, the outer end of which is adapted to be normally thrown into engagement with the trigger arm to hold the valve in an open position, a spring connecting the valve lever and trigger arm adapted to throw the valve into closed position when the valve lever is released by the trigger arm, a pressure indicating scale formed on the outer cylinder surface, and means connected with the piston and rod and adapted to move in unison with same for indicating the pressure within the cylinder.

4. The combination in a pressure regulating device, of a cylinder, a valve controlled inlet and outlet on said cylinder, a slidably mounted piston within said cylinder adapted to be actuated by air pressure admitted through the inlet, a piston rod secured to said piston, a spring interposed between one end of the cylinder and the piston to prevent air under pressure admitted through the inlet from moving the piston until a predetermined pressure has been obtained, a spring-pressed, valve-controlling lever, a latch arm engaging therewith and disengageable by the outward movement of the piston, and a nut adjustable on the piston rod, and engaging the latch arm to release the valve-controlling lever, so that the valve may be closed when a definite pressure in the cylinder is reached.

In testimony whereof I have hereunto set my hand in the presence of two subscribing witnesses.

HENRY R. BICKFORD.

Witnesses:
FRED A. TREAT,
W. G. HUDSON.